United States Patent
Kilday et al.

(10) Patent No.: US 10,979,511 B2
(45) Date of Patent: *Apr. 13, 2021

(54) METHOD AND SYSTEM FOR CONNECTION POOLING FOR CONTENT MANAGEMENT CLIENTS

(71) Applicant: Open Text Corporation, Waterloo (CA)

(72) Inventors: Roger W. Kilday, Danville, CA (US); Shreyas Satyanand Kaushik, Bangalore (IN); Siddaram Siddanna Bali, Gulbarga (IN); Xiaofeng Ma, San Ramon, CA (US); Shu-Shang Sam Wei, Danville, CA (US)

(73) Assignee: Open Text Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,299

(22) Filed: Jan. 29, 2018

(65) Prior Publication Data

US 2018/0152521 A1    May 31, 2018

Related U.S. Application Data

(63) Continuation of application No. 13/630,538, filed on Sep. 28, 2012, now Pat. No. 9,930,122.

(51) Int. Cl.
*G06F 15/16*    (2006.01)
*H04L 29/08*    (2006.01)
*H04L 12/24*    (2006.01)

(52) U.S. Cl.
CPC ......... *H04L 67/142* (2013.01); *H04L 67/141* (2013.01); *H04L 67/148* (2013.01); *H04L 41/0856* (2013.01)

(58) Field of Classification Search
CPC . H04L 67/14; G06F 2209/5011; G06F 9/5005
See application file for complete search history.

(56) References Cited

U.S. PATENT DOCUMENTS

| | | | |
|---|---|---|---|
| 7,647,370 B1 * | 1/2010 | Liu | H04L 67/08 709/203 |
| 7,937,493 B2 | 5/2011 | Colrain et al. | |
| 9,032,017 B1 | 5/2015 | Singh et al. | |
| 2004/0006625 A1 * | 1/2004 | Saha | G06F 17/30457 709/227 |
| 2004/0019680 A1 * | 1/2004 | Chao | H04L 29/06 709/226 |

(Continued)

OTHER PUBLICATIONS

Office Action issued in U.S. Appl. No. 13/630,538, dated Jul. 29, 2014, 10 pages.

(Continued)

*Primary Examiner* — Suraj M Joshi
*Assistant Examiner* — Ayele F Woldemariam
(74) *Attorney, Agent, or Firm* — Sprinkle IP Law Group (57) ABSTRACT

Methods and systems for selecting an existing connection from a connection pool. A connection is immediately decoupled from its client session when the client session is released by a user and made available to the same user or other users. Criteria are defined, applied and considered for either re-using an existing connection or creating a new connection.

19 Claims, 8 Drawing Sheets

(56) References Cited

U.S. PATENT DOCUMENTS

| | | | |
|---|---|---|---|
| 2004/0221031 A1* | 11/2004 | Desai | H04L 67/42 709/224 |
| 2005/0154913 A1 | 7/2005 | Barriga et al. | |
| 2006/0031340 A1 | 2/2006 | Mathew et al. | |
| 2008/0228923 A1* | 9/2008 | Chidambaran | H04L 67/14 709/227 |
| 2009/0113531 A1* | 4/2009 | Emmerich | H04L 63/20 709/228 |
| 2011/0218981 A1* | 9/2011 | Retnakumari | G06F 9/544 707/705 |

OTHER PUBLICATIONS

Office Action issued in U.S. Appl. No. 13/630,538, dated Dec. 29, 2014, 12 pages.
Office Action issued in U.S. Appl. No. 13/630,538, dated May 8, 2015, 13 pages.
Office Action issued in U.S. Appl. No. 13/630,538, dated Oct. 23, 2015, 11 pages.
Office Action issued in U.S. Appl. No. 13/630,538, dated Apr. 8, 2016, 14 pages.
Office Action issued in U.S. Appl. No. 13/630,538, dated Aug. 5, 2016, 14 pages.
Office Action issued in U.S. Appl. No. 13/630,538, dated Nov. 18, 2016, 13 pages.
Notice of Allowance issued in U.S. Appl. No. 13/630,538, dated Jun. 14, 2017, 19 pages.
Notice of Allowance issued in U.S. Appl. No. 13/630,538, dated Oct. 31, 2017, 14 pages.

* cited by examiner

METHOD AND SYSTEM FOR CONNECTION POOLING FOR CONTENT MANAGEMENT CLIENTS

CROSS-REFERENCE TO RELATED APPLICATION(S)

This patent application is a continuation, and claims a benefit of priority under 35 U.S.C. § 120, of U.S. patent application Ser. No. 13/630,538, filed Sep. 28, 2012, entitled "METHOD AND SYSTEM FOR CONNECTION POOLING FOR CONTENT MANAGEMENT CLIENTS," issued as U.S. Pat. No. 9,930,122, which is fully incorporated by reference herein.

TECHNICAL FIELD

This disclosure relates generally to the field of database management, and more particularly, to an apparatus and methods for managing client sessions and connections in a content management system.

BACKGROUND

In a distributed computing system having a content management system including a data repository, users (through client devices) establish sessions with the content management system in order to access the data repository for read and/or write operations. When a user completes a session, the session is released into a pool that holds the sessions for a brief time period, typically five seconds. However, since the session encapsulates the connection to the server, the connection remains integrally coupled with the session in the user's level 1 pool, and the connection is not available for others to re-use. The theory is that the original user may want to re-initiate that session while still logged in, and having the connection still coupled to the session facilitates re-use by the same user.

The reality is that there is usually very little re-use of connections during the period when the original user is logged in, and thus, waiting for five seconds before allowing sharing and re-use of connections appears to waste both time and resources. Therefore, it would be desirable to instead allow connections to be decoupled from the session immediately upon release of the session by the user, and to provide logical techniques for selection of connections for re-use.

DETAILED DESCRIPTION

This disclosure describes methods and systems for selecting existing connections for re-use or creating new connections. When sessions are released by a user, the encapsulated connection to the server is decoupled from the session and made immediately available to other users (or the same user) in a connection pool. One set of rules is applied when there are available connections in the connection pool. Another set of rules is applied when there are no available connections in the connection pool. Both sets of rules evaluate criteria in terms of the number of available connections, where minimum, maximum and optimum values are preset for the total number of available connections.

1. OPERATING ENVIRONMENT

Figure 1:
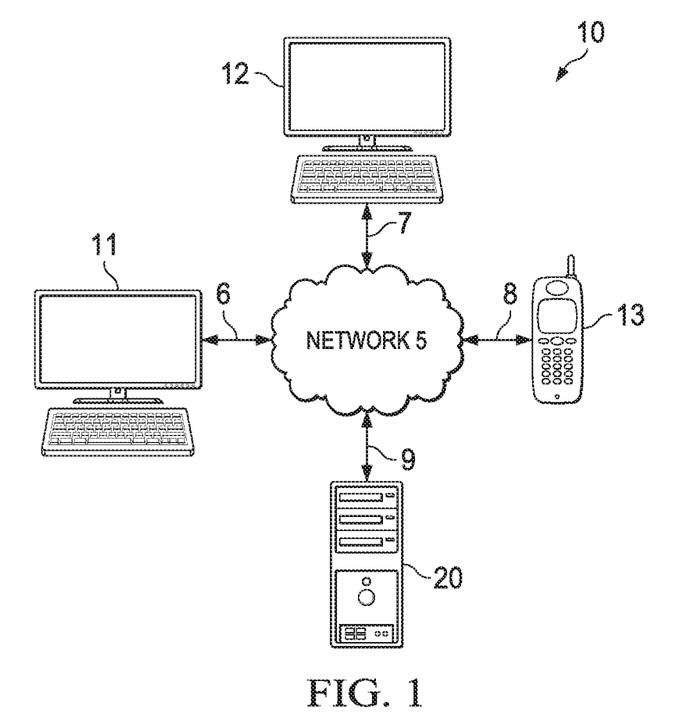
FIG. 1 is a block diagram illustrating a distributed computing system.

FIG. 1 is a simplified block diagram of a distributed computer network 10. Computer network 10 includes a number of client systems 11, 12, 13 coupled to a server system 20 via a communication network 5. Each of the client systems 11, 12, 13 and the server system 20 are coupled to the communication network 5 by communication links 6, 7, 8, 9, respectively. There may be any number of clients and servers in a system. Communication network 5 provides a mechanism for allowing the various components of distributed network 10 to communicate and exchange information with each other.

Communication network 5 may include many interconnected computer systems and communication links. Communication links 6, 7, 8, 9 may be hard wire links, optical links, satellite or other wireless communications links, wave propagation links, or any other mechanisms for communication of information, and may be the same or different for the various hardware components that are coupled to the network 5. Various communication protocols may be used to facilitate communication between the various systems shown in FIG. 1, including TCP/IP, HTTP protocols, wireless application protocol (WAP), vendor-specific protocols, customized protocols and others. In one embodiment, communication network 5 is the Internet, while in other embodiments, any suitable communication network may be used including a local area network (LAN), a wide area network (WAN), a wireless network, an intranet, a private network, a public network, a switched network, any combinations of these, and the like.

Distributed computer network 10 is merely one illustrative embodiment and is not intended to limit the scope of the disclosure. One of ordinary skill in the art would recognize many other variations, modifications and alternatives in how to effectively arrange such components and systems.

In a typical client/server arrangement as shown in FIG. 1, one or more client systems may request information from the server system, which responds to the client by providing the requested information. For this reason, a server system will typically have more computing and storage capacity than client systems, and indeed, the server system may be a gateway and content manager for providing access to content storage and related repository services as further described below. However, a particular computer system may act as either a client or a server depending on whether the computer system is requesting or providing information. Further, although aspects of the subject matter disclosed herein are described as using a client/server environment, it should be apparent that the subject matter may be embodied in other ways, for example, as a stand-alone computer system, or part of a cloud-computing environment.

Server system 20 receives requests for information from one or more of client systems 11, 12, 13 and performs processing in order to satisfy the requests, then forwards the resultant information back to the requesting client system. The processing required to satisfy the request may be performed by server system 20 or may alternatively be delegated to or obtained with the help of other servers connected to communication network 5 or to server system 20.

Client systems 11, 12, 13 enable users to access and query information stored or managed by server system 20. In one embodiment, a web browser application executing on a client system enables users to select, access, retrieve and/or query information stored or managed by server system 20. Examples of web browser programs include the Internet Explorer browser by Microsoft Corporation, the Firefox browser by Mozilla Foundation, and others.

Figure 2:
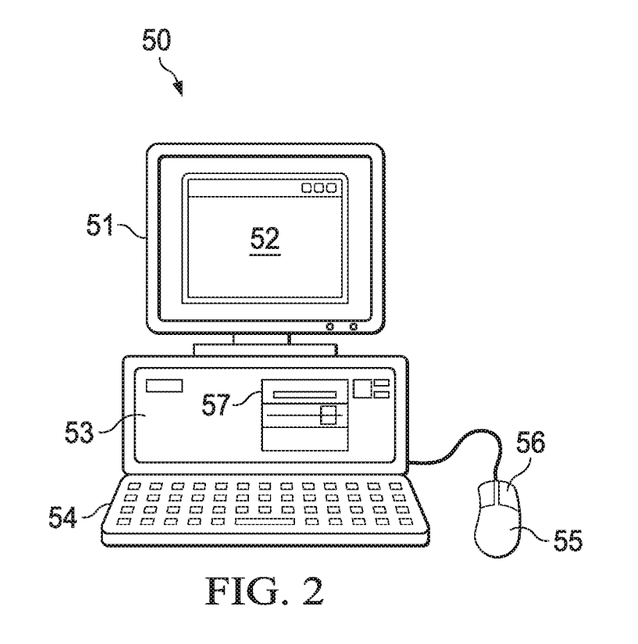
FIG. 2 is a front plan view of a computer workstation useful in the distributed computing system of FIG. 1.

FIG. 2 shows an exemplary computer workstation 50 that may serve as either a client or server system, including a monitor 51 with display screen 52, CPU cabinet 53, keyboard 54 and mouse 55 having one or more selection buttons 56. CPU cabinet 53 houses familiar computer components, such as mass storage devices 57, and other internal components which are not shown, such as a processor, memory, and the like, as further described with reference to FIG. 3 below.

Mass storage devices 57 may include disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

The subject matter described herein may be computer-implemented in a suitable system by providing computer-executable instructions stored on a non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic energy, radio frequency signals, acoustic or light waves, such as those generated during radio wave and infrared data communications.

For example, a binary machine-executable version of software instructions for providing the features described herein may be stored or reside in RAM or cache memory, or on mass storage device 57. The source code of the software may also be stored or reside on mass storage device 57 (e.g., hard disk, magnetic disk, tape or CD-ROM). As a further example, software code may be transmitted via wires or radio waves, or downloaded through a network such as the Internet.

Figure 3:
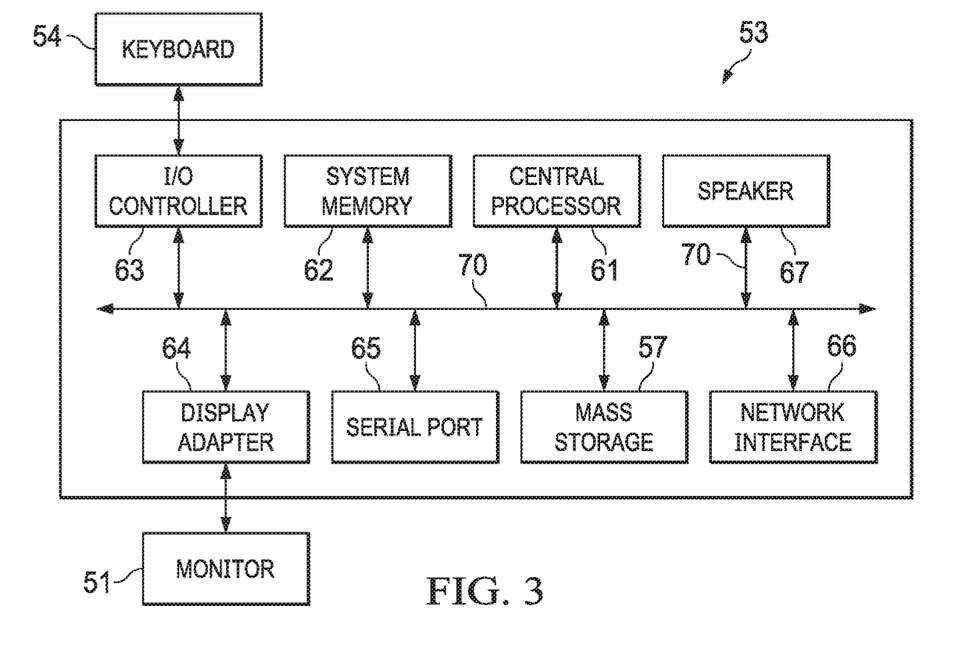
FIG. 3 is a block diagram of the components of the computer workstation of FIG. 2.

A system block diagram of the computer system/workstation 50 is shown in FIG. 3. The display monitor 51, keyboard 54 and storage devices 57 are as shown in FIG. 2. The CPU cabinet 53 contains key components such as central processor 61, system memory 62, input/output (I/O) controller 63, display adapter 64, serial or universal serial bus (USB) port 65, network interface 66, and speaker 67. In other embodiments, a computer system may include more or fewer components and/or subsystems. For one example, a computer system could include more than one processor (i.e., a multiprocessor system) or a system may include a cache memory.

The system bus 70 of computer system 50 are exemplary of an interconnection scheme serving to link the subsystems. For example, speaker 67 could be connected to the other subsystems through a port or have an internal direct connection to central processor 61. The processor 61 may include multiple processors or a multi-core processor, which may permit parallel processing of information. Computer system 50 is only one example of a suitable computer system. Other configurations of components and/or subsystems suitable for use with the methods described herein will be readily apparent to one of ordinary skill in the art.

Computer software products may be written in any of various suitable programming languages, such as C, C++, C#, Pascal, Fortran, Perl, Matlab (from Math Works), SAS, SPSS, JavaScript, AJAX, Java, SQL, and XQuery. A computer software product may be an independent application with data input and data display modules. Alternatively, computer software products may be classes that are instantiated as distributed objects, or component software such as Java Beans or Enterprise Java Beans (both by Oracle Corporation). In one embodiment, the subject matter described herein is embodied as a computer program product which stores instructions, such as computer code, that when executed by a computer cause the computer to perform the processes and/or techniques described below.

The computer system 50 runs an operating system (OS) to manage hardware resources and provide common application services for application software. As an example, the computer 50 may run a Microsoft Windows® operating system (e.g., Windows NT, Windows XP, Windows Vista, Windows 7, Windows CE, Windows Mobile), or Linux, UNIX, Sun OS, Solaris, Mac OS X, Alpha OS, AIX, IRIX32, or IRIX64. Other operating systems may also be used.

2. CONTENT MANAGEMENT PLATFORM

Figure 4:
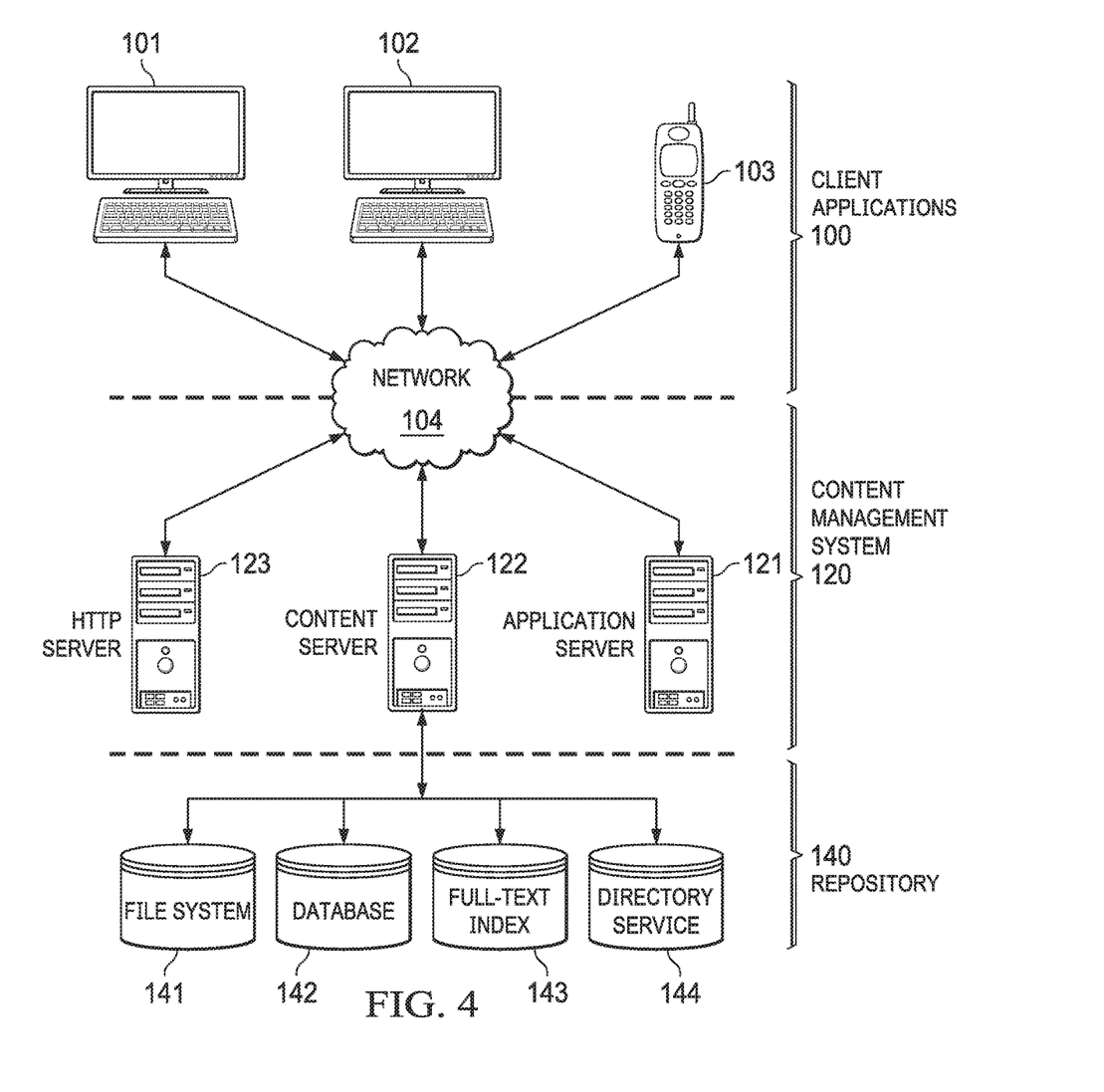
FIG. 4 is a block diagram illustrating the basic structure of an enterprise content management system.

FIG. 4 illustrates a more detailed embodiment of a distributed client/server system that provides an enterprise-level content management and repository service. A repository system 140 is operated and managed by a content management system 120, which in turn provides access to the repository for client applications 100.

The client applications 100 reside in client devices, such as devices 101, 102, 103, which communicate through a network 104 with an application server 121 in order to use one or more applications hosted on the application server. In one embodiment, the network 104 is an Ethernet connection using conventional TCP/IP communication methods with both client devices and server devices. However, other types of network connection technologies are well known and may also be used to full advantage, including local area network (LAN), wide area network (WAN), storage area network (SAN), the Internet, etc. Client devices may be any type of processor-based digital device, such as desktop or laptop computer, iPhone® or other smart hand-held device, or other.

The application server 121 hosts one or more applications running on a content management platform that provide access to repository 140 for clients hosted on content server 122, which is also accessible to clients via network 104. An HTTP server 123 is also coupled to the network 104 to provide an administrative terminal for system operators to perform system maintenance, logging, access control, etc.

The repository 140 is provided for use by client applications 100, through the content server 122, which is accessible to the client devices through a network 104. The repository 140 may include a file store 141 for storing content items, a relational database 142 for storing attributes/metadata associated with the content items, a full-text index store 143 for the content items, and directory services 144.

A software platform runs on each of the various components, such as the EMC Documentum Platform software and related EMC Enterprise Content Management software, distributed by EMC Corporation, Hopkinton, Mass. The Documentum Platform provides capabilities for managing enterprise content and is the foundation for related content management and case management product offerings.

Figure 5:
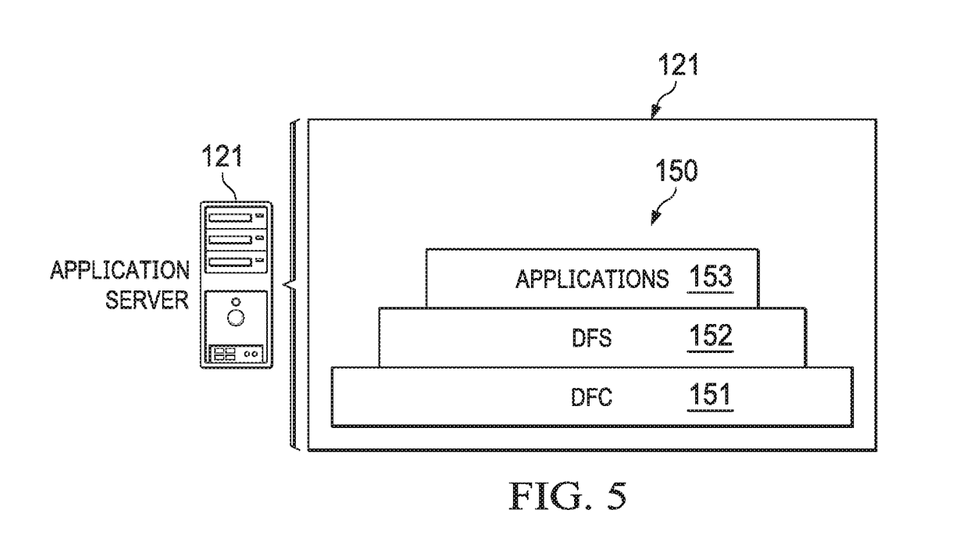
FIG. 5 is a block diagram illustrating the software framework implemented in a component of FIG. 1.

For example, FIG. 5 shows one simplified embodiment of the application server 121, which runs a content management framework 150 having a foundation layer 151, such as Documentum Foundation Classes (DFC), an interface layer 152, such as Documentum Foundation Services (DFS), and one or more applications on application layer 153 having integrated Documentum functionality through a Web Development Kit (WDK) or Webtop, for example. The HTTP server 123 runs a similar content management framework, for applications such as System Administrator or Intranet Client.

DFC is the programming interface for accessing the functionality of the Documentum platform through Java and COM class libraries and underlies all Documentum platforms. DFS is an SOA development framework and application programming interface (API), based on web services, and designed to support interoperable machine-to-machine interaction over a network. DFS is now the primary interface for most developers and users of the Documentum platform.

Each of the clients 101, 102, 103 also runs a content management framework, with the API provided by the Documentum Client Library (DMCL), which is a linked library inside the client application (a DLL in Windows; a shared library in Unix). The DMCL takes documented API calls made by the client application and maps them to Server RPC functions that can be executed by the Content Server. Once the API call has arrived inside the Content Server, processing is no longer affected by the DMCL environment. In fact the DMCL thread that made the call will simply be sleeping awaiting the results of the processing from the server.

The Documentum platform also includes an extensible Business Objects Framework (BOF) which is built into DFC. BOF provides a useful framework and methodology for developing reusable business logic components called Business Objects that can be plugged into middle tier or client applications. More information about the Documentum Platform and related content management and case management product offerings can be found on the EMC website located at URL www.emc.com.

3. SESSION MANAGEMENT

A session is established between a client and the data repository when the client software issues an API call to connect to the content server and access the data repository. DFC creates a session on the client, and the content server creates a thread/process representing the session on the server. A session created on the client device typically does not have a timeout associated with it, but will remain in client memory until disconnected. A session on the server, however, will usually have a timeout set in the configuration file. The server assigns a socket connection to the session, and that socket connection is embedded by the client session, i.e., the session and connection are intimately and exclusively coupled.

Sessions are beneficial to users in many respects, and a typical DFC application comprises multiple sessions coupled to the same or different repositories. A session manager is a DFC object that manages sessions on behalf of a single user for one or more repositories. A session manager typically provides the following functionality: create and release sessions; provide session pooling capability; handle transactions; and provide session diagnostic data. An effective session manager is tasked simply with (i) acquiring the session, (ii) creating or retrieving an object, (iii) manipulating the object, and (iv) releasing the session.

Figure 6:
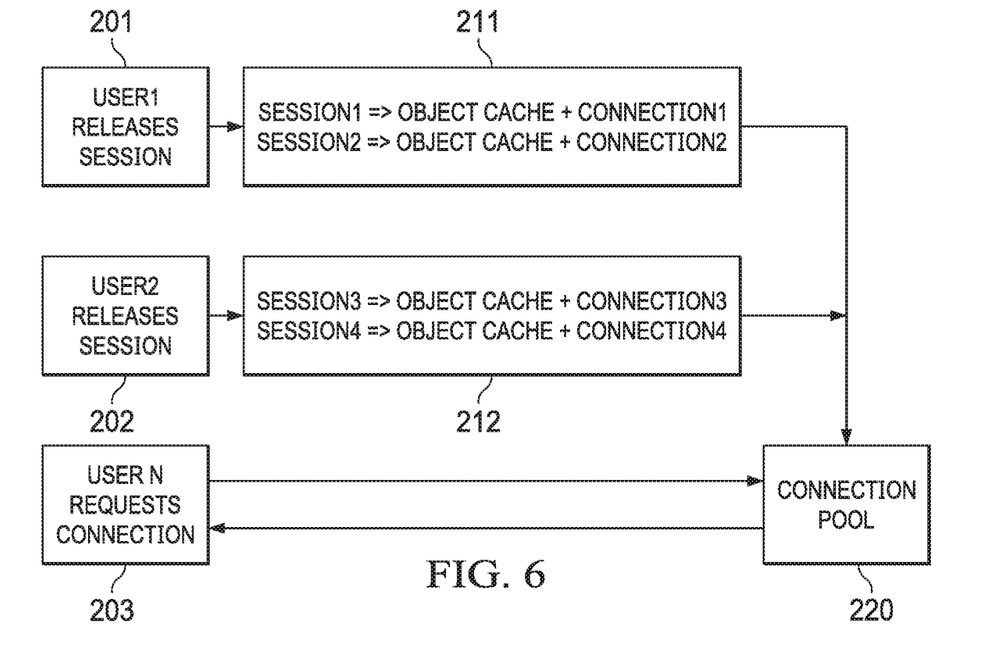
FIG. 6 is a schematic block diagram flow illustrating a prior art method for releasing client sessions.

Referring now to FIG. 6, one prior approach to managing sessions and connections on the client is illustrated schematically. When a first user 201 finishes a session, the session is released into the first user's session manager cache 211 with the connection still coupled to the session. For example, a first session, Session1, and a second session, Session 2, have been released to the cache 211. The first session consists of an object cache and a first connection, Connection1, while the second session consists of an object cache and a second connection, Connection2. Likewise, when a second user 202 finishes a session, the session is released into the second user's session manager cache 212 with the connection still coupled to the session. For example, a third session, Session3, and a fourth session, Session4, have been released to the cache 212. The third session consists of an object cache and a third connection, Connection3, while the fourth session consists of an object cache and a fourth connection, Connection4.

The session manager caches 211 and 212 are considered Level 1 pools, each pool containing only sessions and coupled connections for a specific user. After a timeout, typically five seconds (configurable), session objects are flushed from the session pool and the connection released to a connection pool 220, which is considered a Level 2 pool, i.e., shared by multiple users. However, because of the timeout associated with the level1 pool, many existing connections sit unused while other new connections are created.

The connection pool 220 may be scoped by clients requesting connections. For example, a third user 203 requesting a new connection will look first to the connection pool 220 to re-use an existing connection before asking the server to provide a new connection. Connections in the connection pool are released after a time delay, typically five minutes (configurable).

In a multi-session environment, holding the connections in the session pool can be costly since these sessions cannot be shared with other session managers. Thus, these pooled connections generally remain idle. The presence of too many idle connections will increase the load on the content server and slow down processing at the content server.

Figure 7:
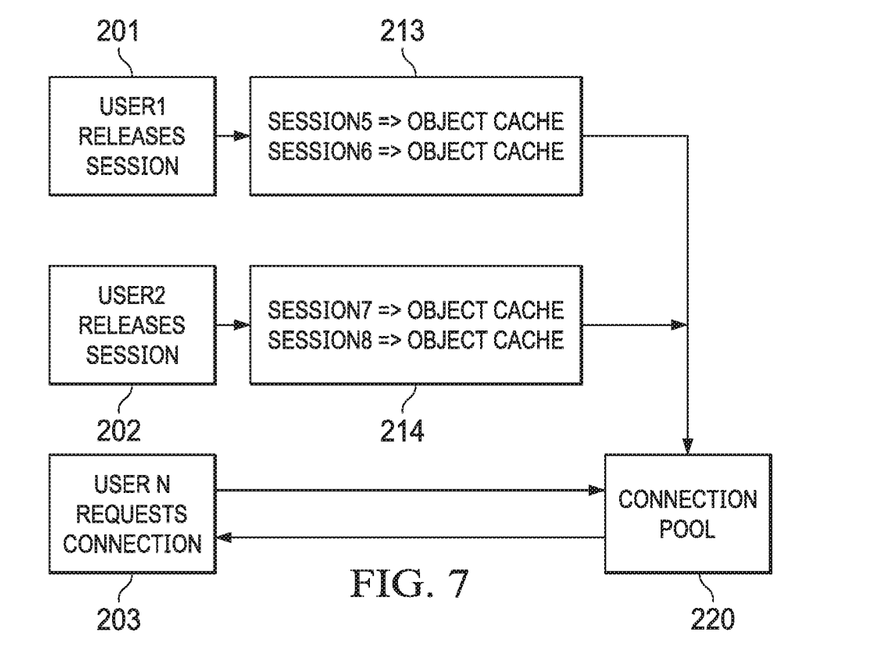
FIG. 7 is a schematic block diagram flow illustrating an improved method for releasing client sessions.

Referring to FIG. 7, an improved method of managing sessions and connections on the client is illustrated. Now, when the first user 201 or second user 202 finishes a session, those sessions are released into session manager caches 213 and 214, respectively, but the connections are decoupled from the sessions and released immediately to the level 2 connection pool 220. For example, the first user 201 has released a fifth session, Session5, and a sixth session, Session6, into the session manager cache 213 or level 1 pool, but each of these sessions has been decoupled from its connection, and those connections have been sent immediately to the connection pool 220. Likewise, the second user 202 has released a seventh session, Session7, and an eighth session, Session8, into the session manager cache 214, but each of these sessions has also been decoupled from its connection, and those connections have also been sent immediately to the connection pool 220. Thus, any user including third user 203 can immediately access and re-use the discarded connections to the server thereby avoiding unnecessary creation of new connections.

For the connection (and its corresponding server session) to be shared by different users, the content server has to authenticate the user each time the user context is switched from one user to another. To do so, the client issues an RPC to AUTHENTICATE_USER. However, to reduce database access during the authentication process, the server should cache enough information to share with sessions when the same user connects to a different session. A new argument, RECONNECT, is used to indicate the session is for sharing by the DFC session pool. This is a flag that will allow the server to bypass some of the authentication steps that are not necessary for a reconnection to an existing connection/server session.

Each time a user has a successful login, a user login record is created with the user's login credentials and an expiration time. A cache for the user login record is checked to see if the RECONNECT arguments passed by the user can be honored. The user login record typically contains the user name, user login name, session token and user login credentials. The user login record cache is implemented as a hash cache, and can be realized using the pseudo code shown in Table I below.

TABLE I

Generate hash code for user login name and session token;
Find hash bucket;
Compare user login name, session token and user credentials;
If all equal, then user login record found;
Update the user login record expiration time; and
Move the entry to the front the LRU list.

The user login record is flushed out of the cache if any security related changes are made to the dm_user object, such as user name, password, or group changes. Also, if the user gets deleted, the user login record will be flushed out. The login record is flushed out directly from shared memory in the local server. For a remote server, the cache flush is triggered by a change checker routine on the change record for the user object. Since the change record does not indicate the specific user changed, the whole cache is flushed out. Re-initialization of the server also causes the whole cache to be flushed.

A global cache, called the client instance cache, is kept in shared memory and used to save the client verification results. The client instance cache contains the client instance ID, the client host name and the client digital signature. If the DFC instance is found in the cache, the cache entry is not expired, and the client hosts are the same, then the server can skip the step of verifying the security certificate.

Another cache called the group cache keeps for each user a list of all groups the user belongs to. Each time a user logs in, the group list gets created from the database, and it may be cached and shared by sessions. Whenever there is a change in the group, the group cache is flushed.

Thus, if the RECONNECT flag is set, the server checks for a user login cache entry using the user login name and session token. If a cache entry is found and not expired, the server will use the cached credentials to authenticate the user. The server compares the cached credentials to the user's login credentials, and will find a match is both have the same password, client host and user ID. If not, then the server proceeds with its regular authentication process.

The methods described herein provide improved performance on the server side since no (or fewer) requests for new connections are made. Further, the client can get sessions back with their object caches intact. On the whole, this means that the session footprint will be smaller. Also, if the load in high, connections are available for immediate re-use that are independent of sessions. This means the system can do more with less resources, and scalability is enhanced.

4. CONNECTION POOLING

The connection pool 220 is a global pool made available for any session manager to take advantage of already initialized connections and thus avoid the bootstrapping time normally associated with creating new connections. When a connection is decoupled from a session and placed in the connection pool 220, any session manager can re-use an existing connection to construct a new session object. If a connection is not used, the server will eventually close the socket when the server session timeout (configurable) is reached, typically five minutes. This section describes rules for picking connections from the connection pool 220.

Figure 8:
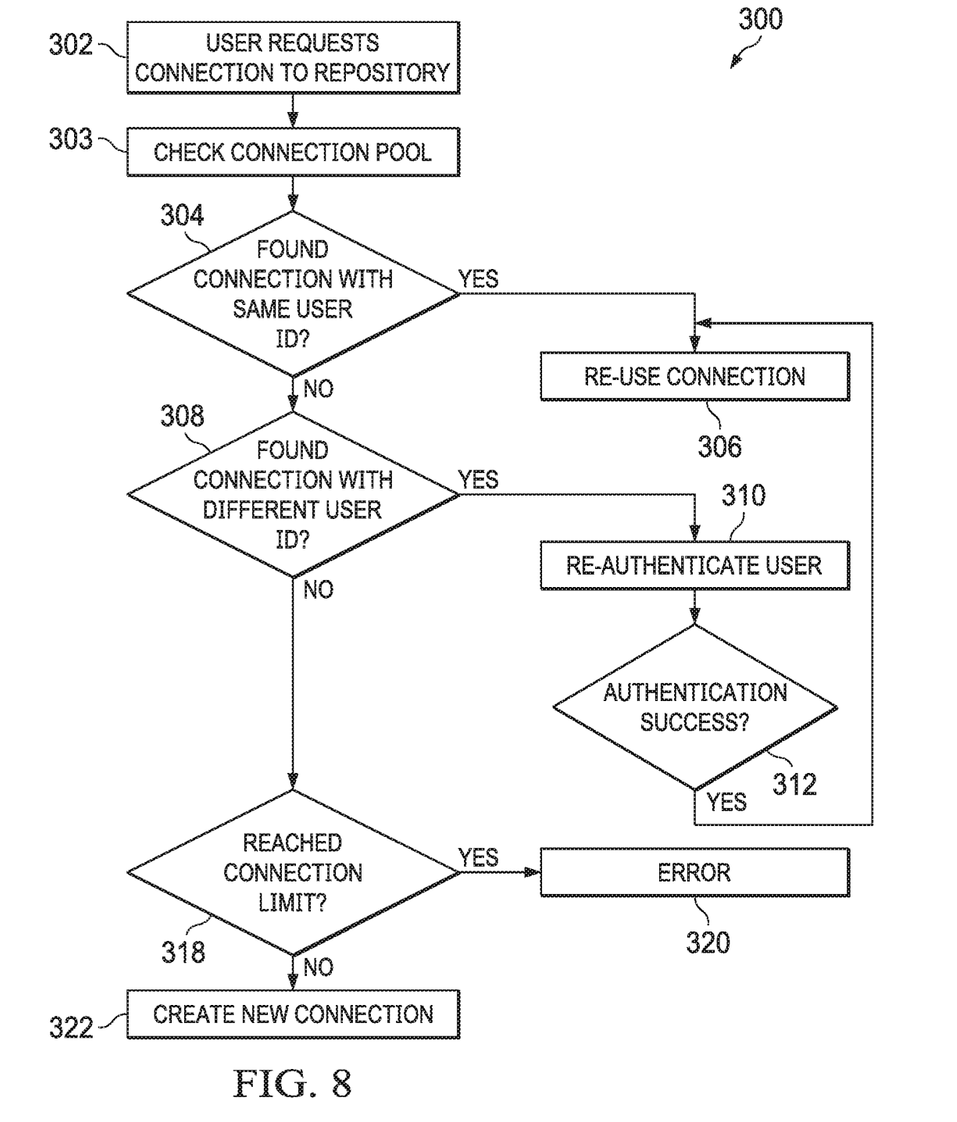
FIG. 8 is a flow chart illustrating a prior art process for selecting connections for reuse.

FIG. 8 illustrates a known process 300 for selecting existing connections from the connection pool 220. However, it should be recognized that the known process 300 has operated in the context of a delay while holding sessions with encapsulated connections in the session pool before connections became available in the connection pool. In step 302, a user/client initiates a request through its session manager for a connection to the data repository, which is accessed through the content server. However, before going to the server and opening a new socket connection there, the session manager will instead look first to its connection pool to see if there are active connections that can be re-used.

First, the session manager looks in step 304 to see if there is an existing connection in the pool with the same user ID. If so, the session manager re-uses the connection in step 306. If not, then the session manager looks for a connection with a different user ID in step 308. If found, the user must be re-authenticated to that connection in step 310. If the re-authentication is successful (step 312), then the connection is re-used in step 306. If not, then an error is generated.

If a connection with a different user ID is not found in step 308, then the session manager considers the limit on number of connections. By default, the maximum connection count limit is 1000 and is configurable. If the limit has been reached in step 318, then the session manager generates an error in step 320. If the limit has not been reached, then a new connection is created in step 322.

Without the delay of holding encapsulated connections in the session pool, many more connections can be re-used.

Figure 9:
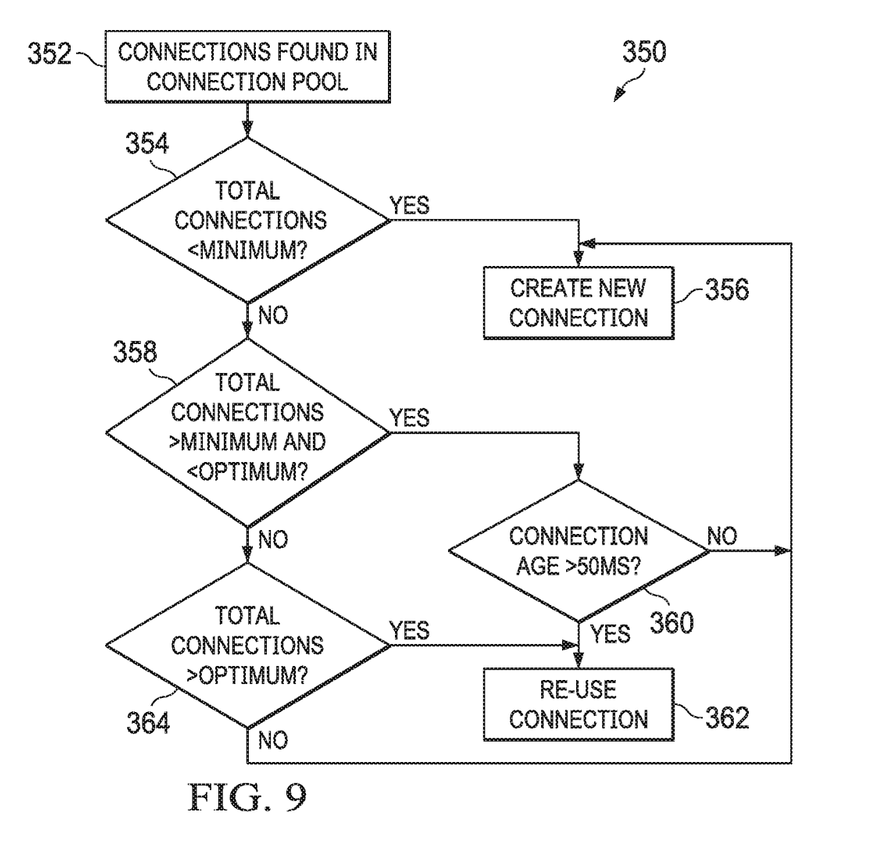
FIG. 9 is a flow chart illustrating a process for applying rules to select existing connections or create new connections when there are available connections in the connection pool.

Prudence dictates that more aggressive policies and rules be developed to manage the re-use of connections and the creating of new connections, in particular, to adapt for varying user loads. Proposed algorithm is more aggressive at sharing (reusing) connections when the user-count is higher, and advantageously, allows re-use of same object cache when the load is low. There is a little advantage in giving the same connection to the session which released it. Thus, when the load is low, pool policy makes sure that we create a new connections instead of re-using someone else's connection. However, when user load is higher (as determined by the optimum count), the connection can be re-used to make the system scalable. For example, FIG. 9 illustrates a pool policy 350 that bases re-use of connections from the connection pool on a comparison with the total number of active connections. In step 352, the session manager determines that there are connections in the connection pool that are available for re-use. This policy example compares the total number of connections to a minimum number, a maximum number and an optimum number in order to determine whether to re-use the connection or to create a new connection. These values can be set in a configuration file.

In step 354, the total number of connections are compared to a defined minimum value. For example, in one embodiment, the defined minimum value for the total number of connections may be set to 5. If the total number is less than the minimum value, then a new connection is created in step 356. If not, then the total number of connections is compared to the minimum value and the optimum value in step 358. The defined optimum value for total number of connections in one embodiment is 28. The optimum number of connections is computed as log 2 of the maximum value.

If the total number of connections is greater than the minimum value and less than the optimum value, then in step 360, the "age" of the connection is evaluated, i.e., how long has this connection been in the connection pool? If the age of the connection is greater than or equal to 50 ms, then the connection is re-used in step 362. If not, that connection is rejected and a new one is created. Minimum connection age (50 ms) is configurable and is useful to allow the same connection to be re-used by a session that released it. Step 364 checks to see if the total is greater than the optimum value, and if so, then the connection is always re-used in step 362.

Figure 10:
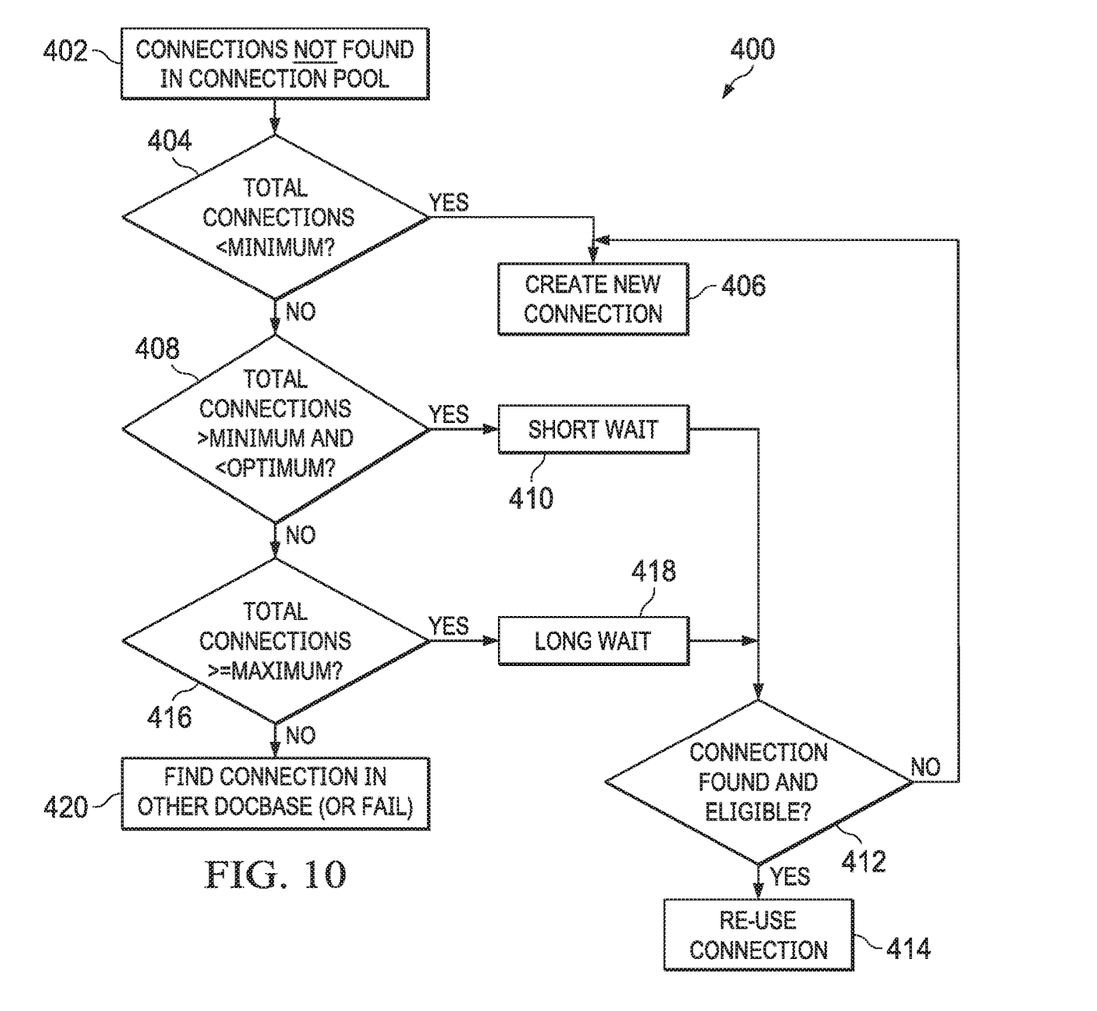
FIG. 10 is a flow chart illustrating a process for applying rules to select existing connections or create new connections when there are no available connections in the connection pool.

If there is a sudden load, the system goes through repeated binge and purge cycles to clear and reacquire connections. FIG. 10 illustrates a queuing policy 400 for when existing connections are not available for re-use from the connection pool for this repository. Connection queuing helps to smooth out spikes in operation requests by checking the queue to see if there are any free connections released during the wait time. This will control sudden expansion of the connection count.

In step 402, the session manager finds no existing connections in the connection pool. If the total number of available connections is less than the minimum value in step 404, then in step 406, a new connection is created. If the total number of connections in not less than the minimum value, but is more than the minimum value and less than the optimum value in step 408, then a short wait takes place in step 410. The short wait is configurable and has a default value of 250 ms. Step 412 checks to see if an unused connection is released during the wait time and if it is eligible for reuse. If so, it is reused in step 414, or else a new connection is created in step 406.

In step 416, if the total is greater than or equal to the maximum value, then a long wait takes place in step 418. Wait time is configurable and default is 5000 ms. Step 412 checks if an unused connection is released during wait time and is eligible for reuse. If yes, it is reused in step 414 else a new connection is created in step 406.

Figure 11:
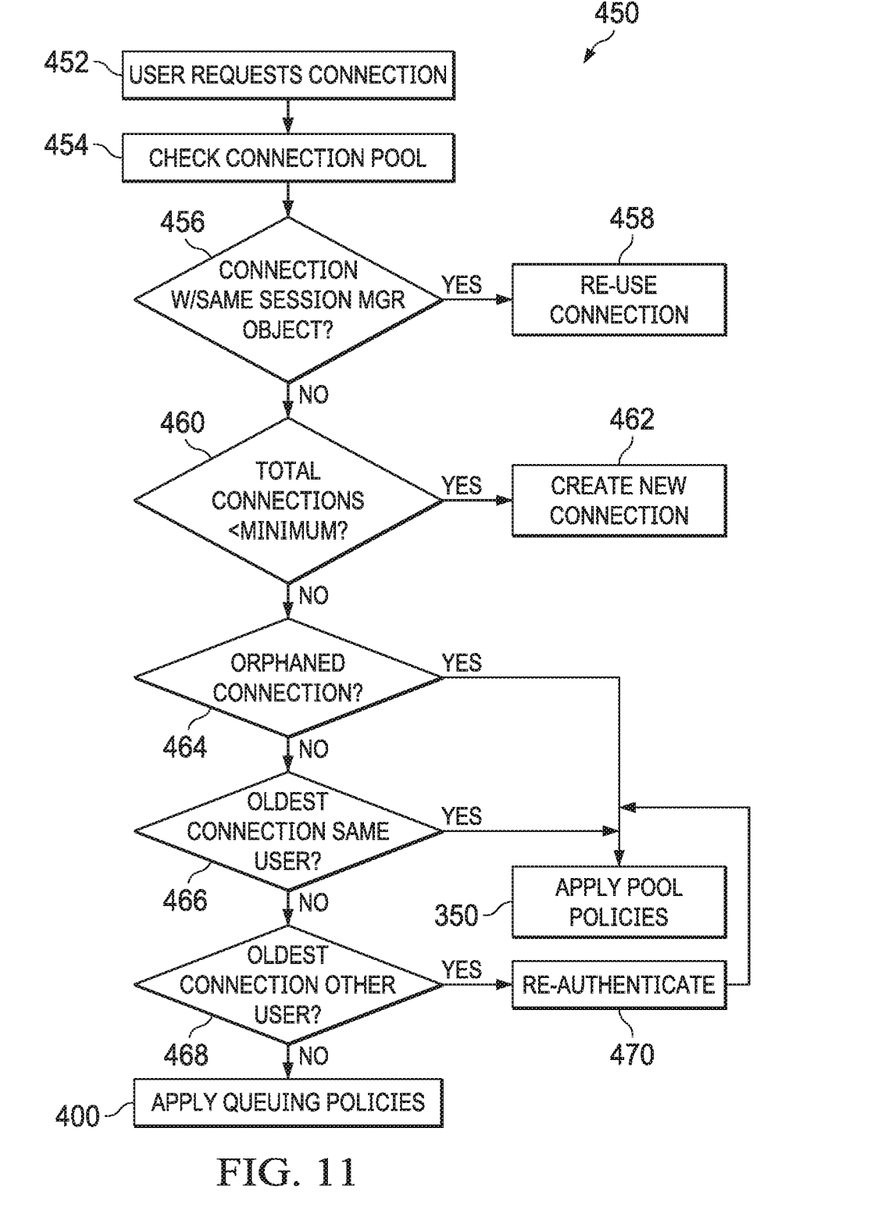
FIG. 11 is a flow chart illustrating an improved process for selecting connections using the rules of FIG. 9 and FIG. 10.

Referring now to FIG. 11, a more detailed process 450 is illustrated for selecting existing connections from the connection pool 220 that uses the pool policies and the queuing policies. As in the prior method, the user requests a connection at step 452 and the session manager checks the connection pool for available connections in step 454. If the session manager finds a connection with the same session manager object in step 456, then the connection is re-used in step 458. If there is not a connection with the same session manager object in step 456, then the total number of available connections is compared to the minimum value in step 460. If the total connections are less than the minimum value, then a new connection is created in step 462. If not, then the session manager looks for an orphaned connection in step 464. An orphaned connection exists when the session manager object has expired. If there is an orphaned connection, then the pool policies are applied in step 350.

If there are no orphaned connections, then the session manager looks for the oldest connection for the same user in step 466. If found, then the pool policies are applied in step 350. If not, then the session looks for the oldest connection of other users in step 468. If found, then the user is re-authenticated in step 470 and the pool policies are applied in step 350. If an old connection from another user is not found in step 466, then the queuing policies are applied in step 400.

5. CONCLUSION

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, or execute acts in a different order than set out in the illustrated embodiments.

The present methods, systems and articles also may be implemented as a computer program product that comprises a computer program mechanism embedded in a computer readable storage medium. For instance, the computer program product could contain program modules for installing and operating the applications described above. These program modules may be stored on CD-ROM, DVD, magnetic disk storage product, flash media or any other computer readable data or program storage product. The software modules in the computer program product may also be distributed electronically, via the Internet or otherwise, by transmission of a data signal (in which the software modules are embedded) such as embodied in a carrier wave.

For instance, the foregoing detailed description has set forth various embodiments of the devices and applications via the use of examples. Insofar as such examples contain one or more functions or operations, it will be understood by those skilled in the art that each function or operation within such examples can be implemented, individually and/or collectively, by a wide range of hardware, software, firmware, or virtually any combination thereof. In one embodiment, the present subject matter may be implemented via Application-Specific Integrated Circuits (ASICs). However, those skilled in the art will recognize that the embodiments disclosed herein, in whole or in part, can be equivalently implemented in standard integrated circuits, as one or more computer programs running on one or more computers, as one or more programs running on one or more controllers (e.g., microcontrollers) as one or more programs running on one or more processors (e.g., microprocessors), as firmware, or as virtually any combination thereof, and that designing the circuitry or writing the code for the software and or firmware would be well within the skill of one of ordinary skill in the art in light of this disclosure.

In addition, those skilled in the art will appreciate that the applications taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, flash drives and computer memory; and transmission type media such as digital and analog communication links using TDM or IP based communication links (e.g., packet links).

These and other changes can be made to the present systems, methods and applications in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

What is claimed is:

1. A method for managing client sessions in a distributed computing environment, including multiple clients coupled to a server through a network, and wherein each client session encapsulates a connection to the server, comprising:
   upon release by a first client of a client session, decoupling, by the first client, a respective connection from the client session and placing the respective decoupled connection into a connection pool associated with the first client;
   requesting, by the first client or a second client, a first connection;
   checking the connection pool for available decoupled connections;
   based on a determination that one or more currently decoupled connections are available in the connection pool for reuse, selecting by the server, between reusing any of the one or more currently decoupled connections from the connection pool as the first connection or creating a new connection as the first connection, the selecting including applying defined criteria for selecting any of the one or more currently decoupled connections from the connection pool for reuse as the first connection, the defined criteria including an age criteria specifying a length of time for a currently decoupled connection to be in the connection pool to be eligible for reuse as a result of a most recent decoupling of the currently decoupled connection, wherein applying the defined criteria comprises:
   determining if a total number of decoupled connections is in a range;
   based on a determination that the total number of decoupled connections is in the range, applying the age criteria to the one or more decoupled connections available in the connection pool; and
   based on a determination that a decoupled connection from the one or more decoupled connections available in the connection pool meets the age criteria, selecting the decoupled connection that meets the age criteria as a selected decoupled connection selected for reuse as the first connection;
   wherein the server is adapted for:
   reusing the selected decoupled connection from the connection pool as the first connection if the defined criteria are met; and
   creating the new connection as the first connection if the defined criteria are not met.

2. The method of claim 1, wherein applying the defined criteria comprises determining if a total number of decoupled connections available in the connection pool meets a minimum threshold criteria.

3. The method of claim 2, wherein the new connection is created if the total number of decoupled connections available in the connection pool is below the minimum threshold criteria.

4. The method of claim 1, wherein applying the defined criteria comprises determining if at least one of the one or more currently decoupled connections available in the connection pool was created by a session manager requesting the connection.

5. The method of claim 1, wherein applying the defined criteria comprises determining whether at least one of the one or more currently decoupled connections available in the connection pool is an orphaned connection.

6. The method of claim 1, wherein applying the defined criteria comprises determining an oldest connection from any user from the one or more currently decoupled connections available in the connection pool.

7. A computer program product comprising a non-transitory computer-readable storage medium encoded with executable instructions for managing client sessions in a distributed computing environment, the executable instructions comprising instructions executable to:
   upon release by a first client of a first client session, decouple a respective connection from the first client session and place the respective decoupled connection into a connection pool associated with the first client;
   receive a connection request for a second session associated with a user;
   check the connection pool for available decoupled connections;
   based on a determination that one or more decoupled connections are available in the connection pool for reuse, apply defined criteria for selecting a currently decoupled connection from the connection pool for reuse for the second session, the defined criteria including an age criteria specifying a length of time for the currently decoupled connection to be in the connection pool to be eligible for reuse as a result of a most recent decoupling of the currently decoupled connection, wherein applying the defined criteria comprises:
   determining if a total number of decoupled connections is in a range;
   based on a determination that the total number of decoupled connections is in the ramie, determining if at least one of the one or more decoupled connections available in the connection pool meets the age criteria; and
   if at least one decoupled connection from the one or more decoupled connections available in the connection pool meets the age criteria, select a decoupled connection that meets the age criteria as a selected decoupled connection;

reuse, for the second session, the selected decoupled connection from the connection pool based on a determination that the defined criteria are met;

create a new connection for the second session based on a determination that the defined criteria are not met; and create the new connection for the second session based on a determination that there are no available decoupled connections in the connection pool.

8. The computer program product of claim 7, wherein the instructions executable to apply the defined criteria comprise instructions executable to determine if a total number of decoupled connections meets a minimum threshold criteria.

9. The computer program product of claim 8, wherein the instructions executable to create the new connection if the defined criteria are not met are executable to create the new connection based on a determination that the total number of decoupled connections is below the minimum threshold criteria.

10. The computer program product of claim 7, wherein the instructions executable to apply the defined criteria comprise instructions executable to determine if at least one of the one or more decoupled connections available in the connection pool was created by a same session manager as issued the connection request.

11. The computer program product of claim 7, wherein the instructions executable to apply the defined criteria comprise instructions executable to determine whether at least one of the one or more decoupled connections available in the connection pool is an orphaned connection.

12. The computer program product of claim 7, wherein the instructions executable to apply the defined criteria further comprise instructions executable to determine an oldest connection from any user from the one or more decoupled connections available in the connection pool.

13. The computer program product of claim 7, wherein the instructions executable to apply the defined criteria further comprise instructions executable to select, as the selected decoupled connection, an available decoupled connection of the one or more decoupled connections available in the connection pool.

14. The computer program product of claim 7, wherein the instructions executable to create the new connection based on the determination that the defined criteria are not met further comprise instructions executable to create the new connection based on a determination that the total number of decoupled connections is in the range and that none of the one or more decoupled connections available in the connection pool meet the age criteria.

15. A content management system for managing client sessions in a distributed computing environment comprising:

a repository having access and storage operations controlled by a content server;

a client computer coupled to the content server by a network, the client computer comprising a processor and a non-transitory computer readable storage medium encoded with executable instructions executable by the processor, the executable instructions comprising instructions executable to:

upon release of a first client session, decouple a respective connection from the first client session and place the respective decoupled connection into a connection pool associated with a first client;

receive a connection request for a second session associated with a user;

check the connection pool for available decoupled connections;

based on a determination that one or more decoupled connections are available in the connection pool for reuse, apply defined criteria for selecting a currently decoupled connection from the connection pool for reuse for the second session, the defined criteria including an age criteria specifying a length of time for the currently decoupled connection to be in the connection pool to be eligible for reuse as a result of a most recent decoupling of the currently decoupled connection, wherein applying the defined criteria comprises:

determining if a total number of decoupled connections is in a range;

based on a determination that the total number of decoupled connections is in the ramie, determining if at least one of the one or more decoupled connections available in the connection pool meets the age criteria; and if at least one decoupled connection from the one or more decoupled connections available in the connection pool meets the age criteria, select a decoupled connection that meets the age criteria as a selected decoupled connection;

reuse, for the second session, the selected decoupled connection from the connection pool based on a determination that defined criteria are met;

create a new connection for the second session based on a determination that the defined criteria are not met; and create the new connection for the second session based on a determination that there are no available decoupled connections in the connection pool.

16. The content management system of claim 15, wherein the instructions executable to apply the defined criteria comprise instructions executable to determine if a total number of decoupled connections meets a minimum threshold criteria.

17. The content management system of claim 16, wherein the instructions executable to create the new connection if the defined criteria are not met are executable to create the new connection based on a determination that the total number of decoupled connections is below the minimum threshold criteria.

18. The content management system of claim 15, wherein the instructions executable to apply the defined criteria further comprise instructions executable to select, as the selected decoupled connection, an available decoupled connection of the one or more decoupled connections available in the connection pool.

19. The content management system of claim 15, wherein the instructions executable to create the new connection based on the determination that the defined criteria are not met further comprise instructions executable to create the new connection based on a determination that the total number of decoupled connections is in the range and that none of the one or more decoupled connections available in the connection pool meet the age criteria.

* * * * *

UNITED STATES PATENT AND TRADEMARK OFFICE
CERTIFICATE OF CORRECTION

PATENT NO. : 10,979,511 B2
APPLICATION NO. : 15/882299
DATED : April 13, 2021
INVENTOR(S) : Roger W. Kilday et al.

Page 1 of 1

It is certified that error appears in the above-identified patent and that said Letters Patent is hereby corrected as shown below:

In the Claims

Column 12, Line 62, Claim 7 replace "ramie" with --range--.

Column 14, Line 21, Claim 15 replace "ramie" with --range--.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*